C. B. DALZELL.
MILKING MACHINE.
APPLICATION FILED JULY 22, 1918.

1,296,167.

Patented Mar. 4, 1919.
2 SHEETS—SHEET 1.

INVENTOR.
Charles B. Dalzell,
By Wilhelm & Parker
ATTORNEYS.

C. B. DALZELL.
MILKING MACHINE.
APPLICATION FILED JULY 22, 1918.
1,296,167.
Patented Mar. 4, 1919.
2 SHEETS—SHEET 2.
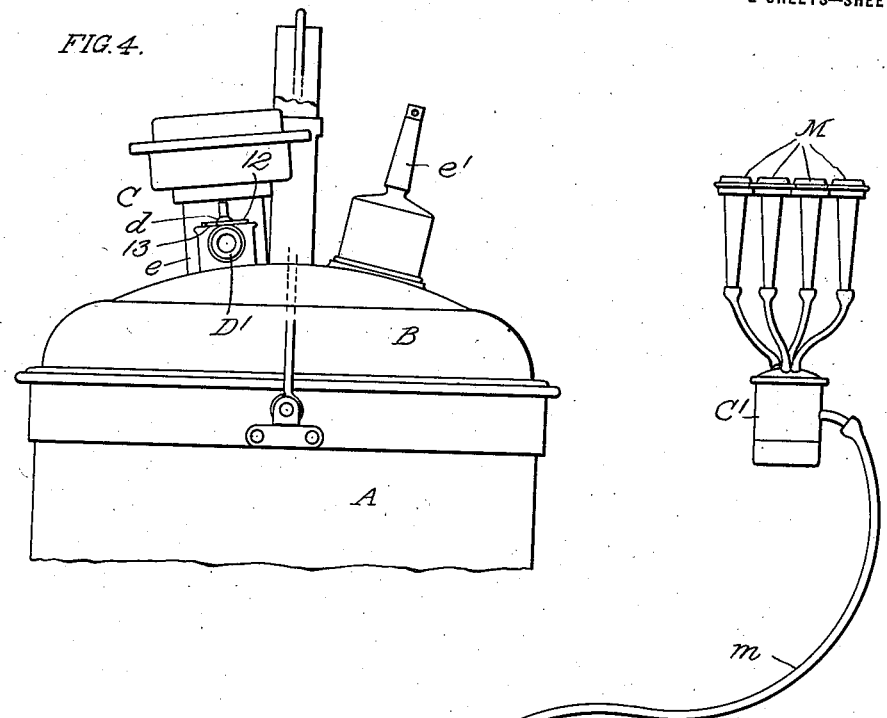
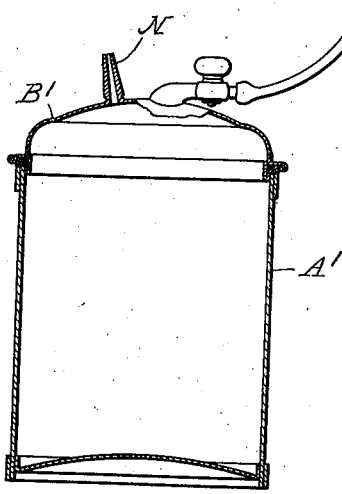
INVENTOR.
Charles B. Dalzell,
By Wilhelm & Parker.
ATTORNEYS.

UNITED STATES PATENT OFFICE.

CHARLES B. DALZELL, OF LITTLE FALLS, NEW YORK, ASSIGNOR TO D. H. BURRELL & COMPANY, OF LITTLE FALLS, NEW YORK.

MILKING-MACHINE.

1,296,167.      Specification of Letters Patent.      Patented Mar. 4, 1919.

Original application filed March 24, 1917, Serial No. 157,087. Divided and this application filed July 22, 1918. Serial No. 246,024.

*To all whom it may concern:*

Be it known that I, CHARLES B. DALZELL, a citizen of the United States, residing at Little Falls, in the county of Herkimer and State of New York, have invented a new and useful Improvement in Milking-Machines, of which the following is a specification.

This application is a division of my application, Serial No. 157,087, filed March 24, 1917.

This invention relates to improvements in milking machines and more particularly in milking machines of that sort adapted to simultaneously milk two cows, in which the receiving pail is divided by a partition into two compartment so as to keep the milk from the cows separate. Some features of the invention are not, however, restricted to a machine having a partitioned pail.

Heretofore, it has been usual to provide these compartment pails with pouring spouts arranged at one side thereof at opposite sides of the partition to enable the milk to be poured simultaneously from both compartments of the pail into two buckets or receptacles standing side by side, and the milker pail has been made of upwardly tapering form or with a top portion of smaller diameter than the bottom of the pail. This was to make the pail stable and give it a fair capacity and at the same time reduce the size of the pulsator or milking mechanism on top of the pail to what was considered a good practical size. The large bottom of the pail also served to protect the projecting pouring spouts from injury by contact with an object.

Milking machine pails of this construction, however, have serious disadvantages. It is difficult to properly clean and wipe out the pails on account of the small size of the upper ends of the compartments and air does not circulate in the pail so as to thoroughly dry it when the pail is inverted after washing. This type of partitioned pail is also much more expensive and difficult to manufacture and requires more stock for a pail of the same capacity than a straight sided or cylindrical pail in which the partition is of like width from end to end. On the other hand, projecting pouring spouts would be objectionable on a straight sided or cylindrical pail because they would not be protected and would be apt to be struck and injured. In the small top pail it has been customary to use a flat cover or pulsator base which locates the milking mechanism very close to the surface of the milk when the pail is full or nearly full, and this has been a source of trouble because of the danger of the foam or milk being sucked up into the vacuum connections if the pail is milked too full. It has been necessary for the best results not to milk the pail fuller than within five or six inches of the top in order to leave a sufficient space for the foam between the surface of the milk and the pulsator. This has necessitated then, making the small top pail five or six inches higher than if some other provision had been made for the necessary space in the pail above the milk.

The objects of this invention are to produce a practical and desirable milking machine pail, preferably of straight sided or cylindrical form, with a cover which furnishes the necessary space above the rim of the pail or the joint between the pail and the cover, so that the pail can be milked full to the brim without danger of the milk or foam being drawn up into the vacuum connections, and to accomplish this without having the pulsator objectionably high in machines in which the pulsator is mounted on the pail cover; also to provide the device with cocks or valves for the milk connections so disposed that if the cocks are loose or are removed, the milk will leak or run directly into the pail and not on the outside thereof, and at the same time so as to facilitate the cleaning of the valve holes; also to improve milking machines in the other respects hereinafter described and set forth in the claims.

In the accompanying drawings:—

Fig. 4 is an elevation of the upper part of the milker viewed at right angles to the section, Fig. 1.

Fig. 5 is a sectional elevation of a milking machine in which a single compartment pail is used and the pulsator is not mounted on the pail cover.

Figure 1:
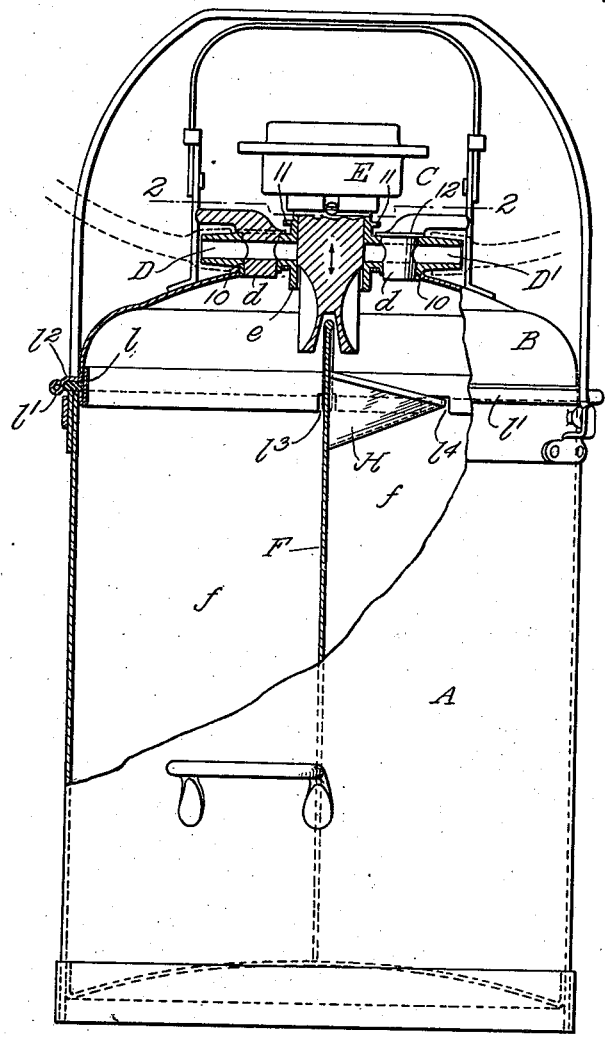
Figure 1 is an elevation, partly in section of a milking machine embodying the invention.
Figure 2:
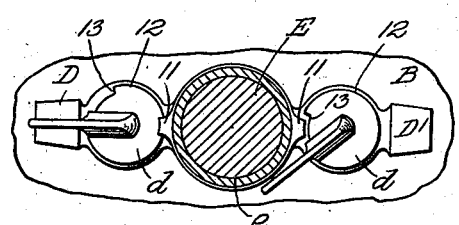
Fig. 2 is a plan view of the milk connections partly in section on line 2—2, Fig. 1.

Referring first to the construction shown in Figs. 1–4.

A represents the pail or milk receptacle of the milking machine, B the cover or top for the pail and C the pulsator mounted on the cover B, which thus constitutes the supporting base for the pulsator or milking mechanism. The pulsator or milking mechanism, with the exception of the arrangement of the stop cocks or valves $d$ for the nipples or connections D D' to which the milk tubes are connected, may be of any usual or suitable construction. The connections D D' and the valves $d$ are preferably arranged as hereinafter described. E is the usual pulsator piston which reciprocates in an open bottomed cylinder $e$ for causing pulsations in the teat cups. $e'$ is the nipple or connection for the vacuum or suction pipe. The milk pail, as usual, is divided by a partition F into two compartments $f\ f'$ for separating the milk from the two cows, and the pulsator piston is located above this partition and is constructed to deliver the milk from the two milk connections D D' into the two compartments of the pail.

The milk pail A is preferably of substantially cylindrical shape or of substantially the same diameter from top to bottom, and may be of any suitable construction. The cylindrical pail with the partition of substantially equal width from end to end is easier and more economical to manufacture than a small top pail, and this form enables the upper ends of the compartments to be made large enough to afford ready access to the compartments for washing and wiping them. The partition F preferably has a curved or arched upper edge which projects upwardly above the rim or upper end of the pail and slopes downwardly from its middle portion, joining the wall of the pail substantially flush with its rim or upper edge.

H represents a pouring deflector which is located in the upper end of the compartment $f$ of the pail for the purpose of directing the stream of milk from this compartment when emptying the pail. This deflector extends inwardly from the cylindrical wall of the pail at one side only of the partition, there being no deflector for the compartment $f'$ at the opposite side of the partition. When the milk is being poured from the pail the deflector H deflects the milk from the compartment $f$ in which it is located away from the partition F, thus keeping the streams of milk discharging from the two compartments separate, and enabling the milk to be simultaneously poured from the two compartments into two receptacles standing side by side.

Since the partition F projects above the upper end or rim of the pail, the pail can be stood upside down in a tilted position in which it rests on the partition and one side of the rim of the pail. In this position, the pail will drain and air can freely enter and circulate in both compartments of the pail, thus insuring the proper drying of the pail after washing it. The projecting partition also assists in preventing injury to the rim of the pail, which should be kept intact to insure a tight joint with the cover.

The pail cover or pulsator base B is preferably of dome shape or of arched form in cross section with its middle portion highest so that the pulsator which is carried by the cover is supported well above the rim of the pail A and ample air space is left in the pail A above the rim of the pail to prevent cover the foam or milk from being drawn up into the vacuum connections when the pail is full. The rim of the cover can be constructed in any suitable way to fit the pail and insure an air tight joint between the cover and the pail. As shown, the cover is provided with a vertical rim flange $l$ which extends down inside of the rim of the pail and with a flange $l'$ which projects outwardly and downwardly over the rim of the pail. $l^2$ is a packing gasket confined in the groove formed between the flanges $l$ and $l'$ and adapted to bear on the rim of the pail to form an air tight joint between the cover and the pail. The depending flange $l$ of the cover shown is notched at $l^3\ l^4$, Fig. 1, to fit over the edges of the partition and deflector. As the cover is dome-shaped or arched it can be made of much lighter or thinner material than a flat cover of equal diameter and nevertheless have adequate strength to withstand the atmospheric pressure on the same, which is very great when the machine is in operation and a partial vacuum is maintained in the pail. The cover thus affords a strong, rigid support for the milking mechanism without being unduly heavy. As there is ample air space in the cover above the joint between the cover and the pail for the proper operation of the machine, the pail can be filled to the brim without causing the milk or foam to enter the vacuum connections, and since the milk will overflow and be wasted when the cover is removed, if the covered pail is filled above the rim, this is not apt to happen more than once. With the present small top pail, in which the pulsator lies substantially flat directly above the surface of the milk, the user will only discover when he removes the cover that the pail is full, and will not know how much milk has been sucked up in the vacuum pipe. The described construction of the cover is then a practical insurance against the foam or milk being carried up into the vacuum connections. Because of the large area of the upper end of the pail and cover, the capacity of the pail is materially increased without making the pulsator objectionably high.

The dome shaped or arched cover providing an unobstructed inclosed space above the rim of the pail or above the joint between the pail, and the cover is also desirable for use with either single or double compartment pails whether the pulsator is mounted on the cover or is located elsewhere, as for instance in machines in which the pulsator is located in the milk connection in the vicinity of the teat cups, and in machines in which no pulsations are produced in the milk tube leading from the teat cups to the pail. In any of these types of machines, a cover constructed as described provides the necessary space above the milk to prevent the milk or foam from being drawn up into the vacuum connections and has the requisite strength for use on a cylindrical or wide mouth pail. In Fig. 5 for example, is illustrated a milking machine having a single compartment pail A′ provided with a cover B′. The pail and cover in this construction may be like those before described except that the pail has no partition. In this machine the pulsator is indicated at C′ near the teat cups M and is connected to the cover by the milk tube or connection m. N is the nipple or connection for the suction or vacuum pipe or tube.

Figure 3:
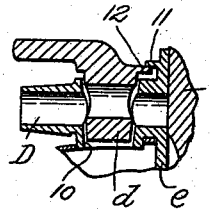
Fig. 3 is a section of one of the milk connections showing the stop cock raised off of its seat for relieving the vacuum in the pail.

The milk connections or nipples D D′ preferably extend horizontally from the pulsator cylinder e close to the underlying cover or pulsator base B, and the openings or seats 10 for the cocks or valves d extend vertically through the nipples with their lower ends opening into the pail. This construction not only enables the cocks to be located lower with relation to the pulsator base, but if the cocks should happen to leak, they will leak directly into the pail instead of on the outside thereof, and when the cock plugs are removed the milk can drain into the pail and the open vertical holes are easy to clean, much easier than if the holes terminated at the bottom of the nipples above the pulsator base B. The cock plugs and their seats are tapered as usual to make a tight fit. This construction also enables the vacuum in the pail to be relieved by merely lifting the plugs slightly, as shown in Fig. 3, thus allowing air to enter the space between the plug and its seat. There is, therefore, no necessity for the additional vacuum relief valve heretofore employed. 11 indicates a stop lug which projects from the pulsator cylinder above a circular flange 12 on each of the cock plugs d and prevents the removal of the plug unless it is turned until a notch 13 in the flange 12 is brought into registration with the stop lug, (see the right hand plug in Fig. 2).

I claim as my invention:

1. In a milking machine, the combination of a pail, an arched cover closing the upper end of the pail, and a pulsator, said cover extending above the rim of the pail and providing a relatively deep substantially unobstructed inclosed space above said rim, and said cover being provided with an air outlet elevated a substantial distance above said rim.

2. In a milking machine, the combination of a pail, an arched cover closing the upper end of the pail, and a pulsator having a cylinder mounted on said cover, said cover having an air tight joint with the pail and providing a relatively deep substantially unobstructed inclosed space above said joint, and said pulsator cylinder being elevated a substantial distance above said joint.

3. In a milking machine, the combination of a pail having an upper end substantially as large as its lower end, an arched cover closing the upper end of the pail and having an air tight joint therewith and providing a substantially unobstructed inclosed space above said joint, said cover having connections for milk and vacuum tubes elevated a substantial distance above said joint.

4. In a milking machine, the combination of a pail of substantially the same diameter at top and bottom, an arched cover closing the upper end of the pail, and a pulsator mounted on said cover, said cover extending above the rim of the pail and providing a relatively deep substantially unobstructed inclosed space above said rim.

5. In a milking machine, the combination of a pail, a pulsator, a milk connection leading to said pulsator, and a valve for said connection, the seat for said valve opening directly into the pail whereby any leakage at said valve will flow directly into the pail.

6. In a milking machine, the combination of a pail, a cover therefor, a pulsator mounted on the cover, a milk connection leading substantially horizontally to the pulsator close to said cover and having a valve hole opening into the pail, and a valve for said connection closing said hole.

7. In a milking machine, the combination of a pail, a cover therefor, a pulsator mounted on the cover, a milk connection leading substantially horizontally to the pulsator close to said cover and having a valve seat hole extending vertically through said connection and opening at its lower end into the pail, and a valve for said connection seated in and closing said hole.

Witness my hand this 18th day of July, 1918.

CHARLES B. DALZELL.

Witnesses:
SAMUEL HOUPT,
G. R. CLINE.